United States Patent [19]
Blumenberg

[11] Patent Number: 5,650,676
[45] Date of Patent: Jul. 22, 1997

[54] ELECTRIC MOTOR WITH IMPROVED SEAL

[75] Inventor: Rainer Blumenberg, Oldenburg, Germany

[73] Assignee: Licentia Patent-Verwaltungs-GmbH, Frankfurt am Main, Germany

[21] Appl. No.: 272,732

[22] Filed: Jul. 11, 1994

Related U.S. Application Data

[63] Continuation-in-part of Ser. No. 256,071, Oct. 4, 1994, Pat. No. 5,576,586.

[30] Foreign Application Priority Data

Oct. 24, 1992 [DE] Germany .................. 42 35 962.7
Jul. 10, 1993 [DE] Germany .................. 43 23 066.0

[51] Int. Cl.⁶ ........................................ H02K 5/10
[52] U.S. Cl. .................. 310/88; 310/89; 310/239
[58] Field of Search .................. 310/42, 52, 85, 310/87, 88, 89, 91, 238, 239, 242, 273

[56] References Cited

U.S. PATENT DOCUMENTS

| | | | |
|---|---|---|---|
| 4,513,214 | 4/1985 | Dieringer | 310/71 |
| 5,124,602 | 6/1992 | Nishimura et al. | 310/68 B |
| 5,184,039 | 2/1993 | Kraft | 310/89 |
| 5,315,195 | 5/1994 | Bradfield et al. | 310/89 |
| 5,338,995 | 8/1994 | Takada | 310/89 |
| 5,440,186 | 8/1995 | Forsell et al. | 310/239 |

*Primary Examiner*—Mark O. Budd
*Attorney, Agent, or Firm*—Spencer & Frank

[57] ABSTRACT

An electric motor assembly has a motor housing which includes a generally cylindrical housing shell and a base part closing one end of the shell; a rotor disposed in the motor housing and including a rotor shaft and a commutator mounted on the rotor shaft; a first bearing mounted in the motor housing adjacent a first end thereof and supporting the rotor shaft; a second bearing affixed to the rotor shaft and being situated in a second end of the housing. The motor assembly further has a brush assembly held in the motor housing at the second end thereof. The brush assembly includes a brush carrier plate closing liquid-tight the second end of the motor housing. The brush carrier plate has a bearing seat for centering and supporting the second bearing. The brush carrier plate includes a fitting part push-fitted into the housing shell at the second end thereof. The brush carrier plate further has an outer cylindrical fitting face being in engagement with an inner surface of the housing shell and a terminal conical sealing face adjoining the outer cylindrical fitting face and being in a face-to-face sealing engagement with an inner conical sealing face of an outwardly flaring extension of the housing shell. The carrier plate supports brushes which are in contact with the commutator.

12 Claims, 3 Drawing Sheets

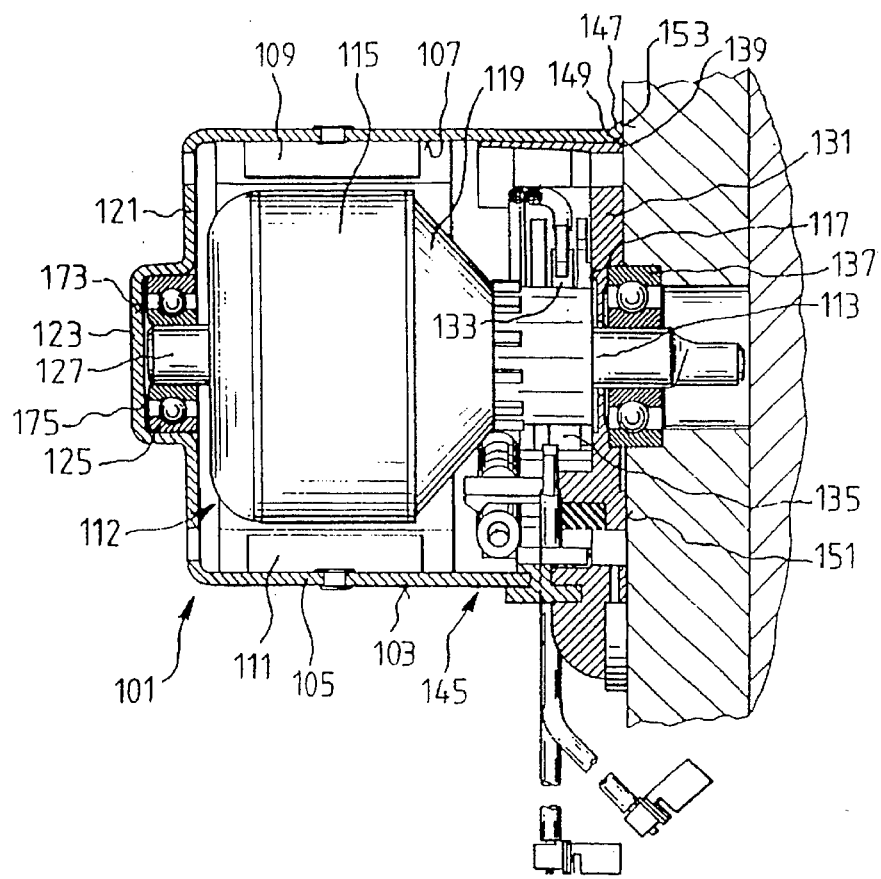

5,650,676

ELECTRIC MOTOR WITH IMPROVED SEAL

CROSS REFERENCE TO RELATED APPLICATION

This is a continuation-in-part of U.S. patent application No. 08/256,071 filed Oct. 4, 1994, now U.S. Pat. No. 5,576,586 which is the U.S. National Phase Application of International Application PCT/DE93/00993 filed Oct. 20, 1993.

This continuation-in-part application claims the priority of German Application No. P 43 23 066.0 filed Jul. 10, 1993 and German Application P 42 35 962.7 filed Oct. 24, 1992, which are incorporated herein by reference.

BACKGROUND OF THE INVENTION

This invention relates to an electric motor, particularly a commutator motor enclosed in its housing liquid-tight and used for driving an axially flanged-on hydraulic pump.

European Published Patent Application 0 472 746 A1 discloses an electric motor in which an eccentric rotor stub shaft projects externally through the bearing plate (closing an end face of the motor housing) for driving plungers of a flanged-on hydraulic pump. In the bearing plate a separate brush carrier plate is mounted; the brushes cooperate with the commutator in a conventional manner. Because of the numerous individual components, the labor input in assembling such an electric motor is very high.

Furthermore, in German Patent Application P 42 35 962.7 an electric motor is described in which a flat sealing element between the motor and the flanged-on hydraulic pump is constituted by the brush carrier plate. In this construction the electric motor flanged to the housing of the hydraulic pump has no bearing plate which closes the motor housing liquid-tight and which normally carries a roller bearing supporting the rotor shaft. In the construction according to German Application P 42 35 692.7 the sealing function between the motor and the pump housing is assumed by the brush carrier plate. The latter simultaneously serves as a centering element for the roller bearing secured to the motor shaft. Such an arrangement constitutes a first verification for the Electric motor in this phase of assembly. Also, the electric motor can safely be transported in such a preliminarily assembled condition. By the elimination of the bearing plate an inexpensive and easily assemblable electric motor unit is provided for driving a hydraulic pump.

SUMMARY OF THE INVENTION

It is an object of the invention to further improve the construction disclosed in German Application P 42 35 962.7 as concerns compactness and an easy assembly.

This object and others to become apparent as the specification progresses, are accomplished by the invention, according to which, briefly stated, the electric motor assembly has a motor housing which includes a generally cylindrical housing shell and a base part closing one end of the shell; a rotor disposed in the motor housing and including a rotor shaft and a commutator mounted on the rotor shaft; a first bearing mounted in the motor housing adjacent a first end thereof and supporting the rotor shaft; a second bearing affixed to the rotor shaft and being situated in a second end of the housing. The motor assembly further has a brush assembly held in the motor housing at the second end thereof. The brush assembly includes a brush carrier plate closing liquid-tight the second end of the motor housing. The brush carrier plate has a bearing seat for centering and supporting the second bearing. The brush carrier plate includes a fitting part push-fitted into the housing shell at the second end thereof. The brush carrier plate further has an outer cylindrical fitting face being in engagement with an inner surface of the housing shell and a terminal conical sealing face adjoining the outer cylindrical fitting face and being in a face-to-face sealing engagement with an inner conical sealing face of an outwardly flaring extension of the housing shell. The carrier plate supports brushes which are in contact with the commutator.

BRIEF DESCRIPTION OF THE DRAWING

FIG. 3 is an axial sectional view of an electric motor assembly according to a preferred embodiment of the invention.

FIG. 4 is a fragmentary sectional enlarged detail of the construction shown in FIG. 3.

DESCRIPTION OF THE PREFERRED EMBODIMENT

Figure 1:
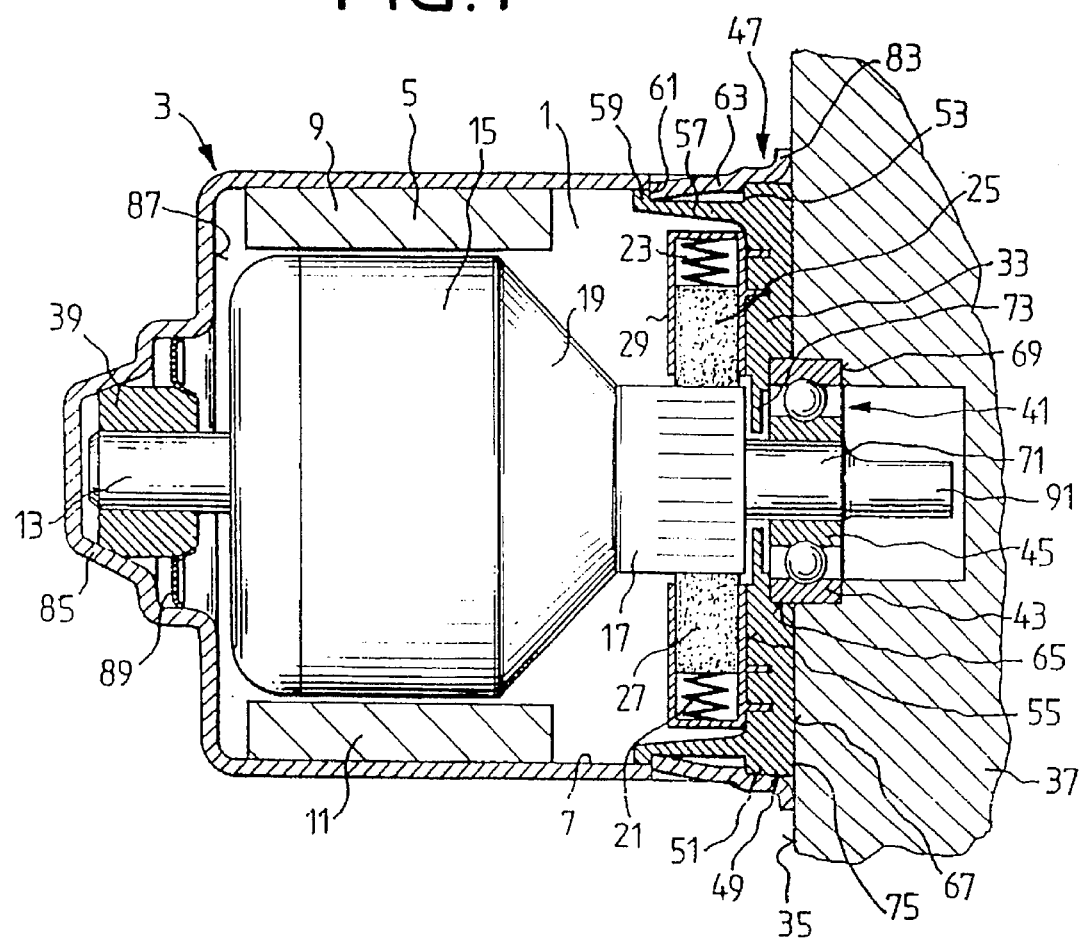
FIG. 1 is an axial sectional view of a commutator motor flanged to a pump housing and constructed according to German Patent Application P 42 35 962.7.

Turning to FIG. 1, there is illustrated therein a liquid-tight electric motor assembly according to German Application P 42 35 962.7. The assembly includes a commutator motor 1 and a pot-shaped motor housing 3 whose cylindrical jacket portion 5 is, on the inner face 7, provided with permanent magnets 9 and 11. In the motor housing 3 there is supported a rotor shaft 13 on which there is mounted a metal lamina stack 15 which, in turn, supports a rotor winding 19 connected to a commutator 17. The commutator 17 is in contact with brushes 25, 27 which are biased by springs 21 and 23 and which are guided in brush guide housings 29 and 31. The brush guide housings 29 and 31 are affixed to a brush carrier plate 33 and are made, for example, of brass. The motor housing 3 is flanged to an end face 35 of a pump housing 37 of a non-illustrated hydraulic pump. Between the end faces of the motor housing 3 and the pump housing 37 a flat sealing element is arranged. The rotor shaft 13 is supported at one shaft end by a roller bearing 39 in the inside of the motor housing 3 and is supported at the other shaft end by a roller bearing 41 which has an outer race 43 and an inner race 45. The bearing 39 is a slide bearing held in place by a clip 89. It is to be understood that a roller bearing may be used in lieu of the slide bearing 39.

The rollerbearing 41 is a sealed bearing which prevents liquid from entering into the bearing and thus into the inside of the motor housing 3.

The rotor shaft 13 projects with its extended eccentric end 91 into the gear housing (pump housing) 37 for driving a non-illustrated plunger of a hydraulic pump associated, for example, with a vehicle anti-lock system.

According to FIG. 1, the flat sealing element disposed between the end faces Of the motor housing 3 and the pump housing 37 is constituted by the brush carrier plate 33. The latter is made of an insulating material and is provided for the brushes 25 and 27 cooperating with the commutator 17. The brush carrier plate 33 simultaneously serves as a centering element for the bearing 41 affixed to the rotor shaft 13 and is, as a lid, fixedly connected with the motor housing 3. The unilaterally open, pot-shaped motor housing 3 is, in the cylindrical edge zone 47 defining the motor housing opening, provided with a stepped fitting face 49 which is in a liquid-tight engagement with a complementally configured cylindrical flange portion 51 of the disk-shaped brush carrier plate 33. Further, the brush carrier plate 33 which may be pressed into the opening of the motor housing 3 in a form-fitting manner, has at its outer edge 53 of its inner end face 55 a plurality of resilient detent hooks 57 whose detent teeth 59 may engage behind detent edges 61 formed by radially inwardly bent metal deformations of the motor housing 3. These metal deformations may be formed by pushed-through lugs 63 in the motor housing 3 or by partially Stamped-out, flexible tabs. By virtue of the above-described features a simple assembly of the brush carrier plate 33 with the motor housing 3 may be achieved and, at the same time, a reliable locking of the brush carrier plate 33 with the motor housing 3 and an accurate pre-centering of the rotor shaft 13 in the motor housing 3 may be ensured. In this manner, even in the preassembled stage of the electric motor 1, a fully testable, readily transportable structure is obtained for eventual use in driving a hydraulic pump.

In the construction according to FIG. 1 at least the bearing 41 is a sealed roller bearing whose outer race 43 is supported partially in a centering opening 65 in the outer end face 67 of the brush carrier plate 33 and partially in a bearing recess 69 in the end face 35 of the pump housing 37. The inner race 45 of the bearing 41 is fixedly mounted by a press fit on a bearing supporting surface 71 of the rotor shaft 13.

Figure 2:
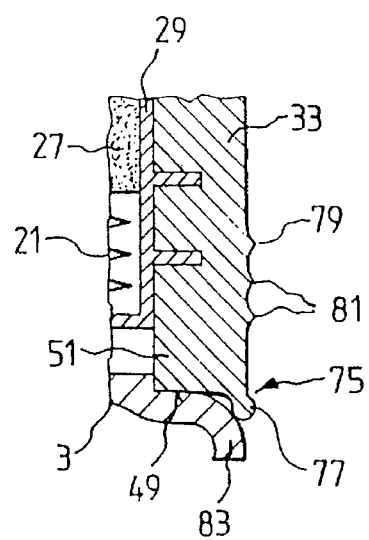
FIG. 2 is a fragmentary axial sectional view of a detail of the construction shown in FIG. 1.

In order to securely prevent penetration of liquids such as oil into the inside of the motor housing 3 from the bearing 41, the centering opening 65 in the end face 67 of the brush carrier plate 33 has an annular stepped depression 73 formed as a labyrinth seal in front of the bearing 41. Also referring to FIG. 2, the brush carrier plate 33 may be provided with a sealing lip 77 at its outer edge 75 on its end face 67 oriented towards the pump housing 37. Further, if required, the end face 67 of the brush carrier plate 33 may have a plurality of annular elevations 79 and 81 which are arranged concentrically to the central opening 65 and which serve as sealing rings. The sealing lip 77 and/or the sealing rings 79, 81 are formed as one-piece members with the brush carrier plate 33. In this manner, without additional structural components, a highly efficient seal is provided against the penetration of liquid into the inside of the motor housing 3.

The motor housing 3 is secured to the pump housing 37 by an outwardly projecting flange part 83 situated at the opening of the cylindrical jacket of the motor housing 3 and extending 90° to the axis thereof. The flange part 83 is provided with screw holes. By a precision-machining of the flange part 83 and the end face 35 of the pump housing 37 there may be achieved such a sealing effect against the penetration of liquid into the pump housing 37 and the motor housing 3 that a sealing lip 77 at the brush carrier plate 33 may be dispensed with.

The bearing 39 for the rotor shaft 13 is, as shown in FIG. 1, arranged in a correspondingly deep-drawn part (bearing seat) 85 in the bottom part 87 of the motor housing 3. The motor housing 3, together with the bearing seat 85, is manufactured in a single operational step so that an inexpensive, easily mountable electric motor is obtained.

According to the invention, the electric motor assembly 1 is improved for the purpose of reducing its outer diameter and for further simplifying the assembling operation. FIG. 3 shows a commutator motor assembly 101 according to the invention, having a pot-shaped motor housing 103 whose cylindrical jacket part 105 is provided at its inner face 107 with permanent magnets 109, 111. In the motor housing 103 a rotor 112 is supported which includes a rotor shaft 113 and a sheet metal stack 115 which receives a rotor winding 119 connected to a commutator 117. The bottom (base) part 121 of the housing 103 has a deep-drawn bearing seat 123 for a ball bearing 125 in which journals the free end 127 of the rotor shaft 113. The commutator motor 101 serves for driving a hydraulic pump which is supported in an axial pump housing 129 flanged to the motor housing 103.

Between the pump housing 129 and the motor housing 103, as in the structure of FIG. 1, a flat sealing element is provided which is of an insulating material and which simultaneously serves as a brush carrier plate 131 for the brushes 133, 135 cooperating with the commutator 117. The brush carrier plate 131 also serves as a centering element for a second roller bearing 137 affixed to the rotor shaft 113 and closes the motor housing 103 in a liquid-tight manner. For this purpose, the motor housing 103 has at its the inner cylindrical surface 107 a conically shaped sealing face 139 which constitutes an extension. Also referring to FIG. 4, the sealing face 139 engages a conical countersealing surface 143 on the brush carrier plate 131. The latter has a cylindrical fitting face 141 which engages face-to-face the inner motor housing surface 107 when the brush carrier plate 131 is pushed into the motor housing 103. The housing 103 which is a deep-drawn component, has at its end 145 that receives the brush carrier plate 131, an integral annular connecting flange 147, the inner side 149 of which forms the sealing face 139. After closing the opening of the motor housing 103, the respective outer surfaces 151, 153 of the brush carrier plate 131 and the connecting flange 147 are situated in a single plane. For purposes of a better sealing effect, the outer surface 151 of the brush carrier plate 131 is provided with a circumferential (closed-circuit), projecting sealing lip 155.

As further illustrated in FIG. 4, the fitting face 141 is formed by the outer face of a collar 157 on the circular brush carrier plate 131. The collar 157 is arranged at the bottom part 159 of the brush carrier plate 131, it extends circumferentially and projects therefrom. The sealing effect against the penetration of liquid into the motor housing 103 is augmented by providing the outer surface of the collar 157 forming the fitting face 141, with projecting, circumferential sealing lips 161, 163. The collar 157 has an inner face 165 widening from the bottom part 159 to the free end 167 of the collar 157 at an angle of preferably 2°.

Figure 5:
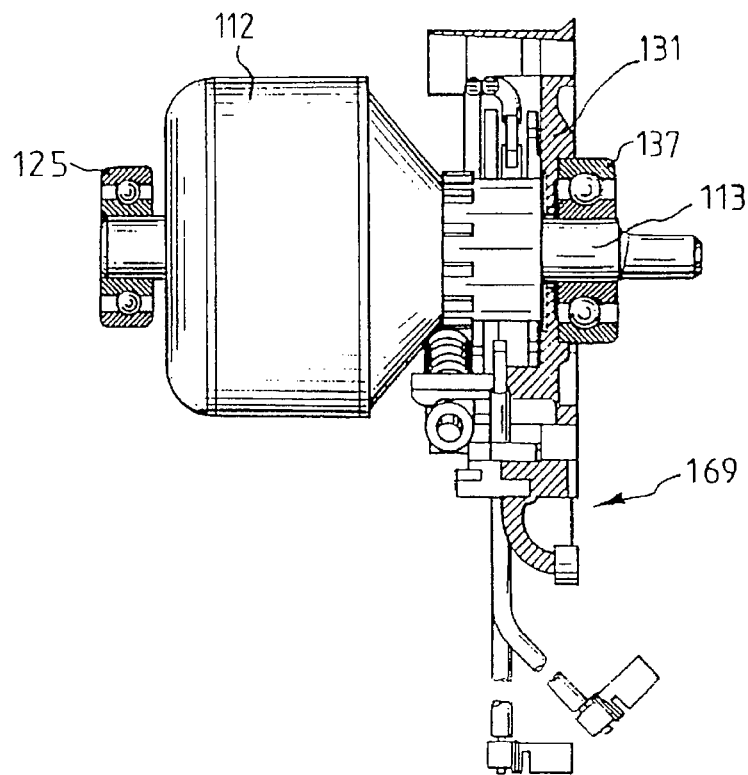
FIG. 5 is a side elevational view of the rotor, also shown in FIG. 3 and constituting, with additional components, a first structural group of the motor assembly.
Figure 6:
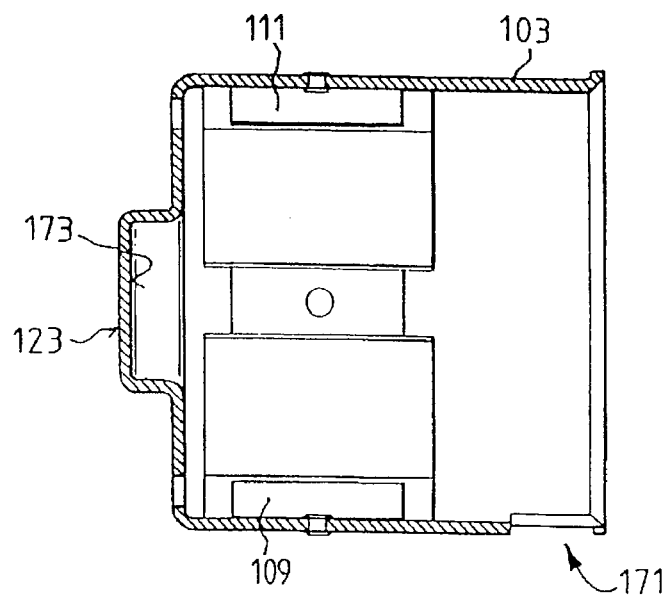
FIG. 6 is an axial sectional view of the motor housing with permanent magnets, also shown in FIG. 3 and constituting a second structural group of the motor assembly.

The final assembly of the motor 101 is simplified by virtue of the fact that the motor 101 is formed of two structural groups 169 and 171 as shown in FIGS. 5 and 6. The structural group 169 includes the rotor 112 with the brush carrier plate 131 and the already-secured bearings 125, 137 whereas the structural group 171 is formed of the motor housing 103 with the permanent magnets 109, 111. By means of a simple push-in connection, the two preassembled structural groups 169, 171 are connectable with one another, as a result of which the permanent magnets 109, 111 mounted on the inner surface 107 are so positioned that their magnetic force maintains the rotor 112 in the housing 103 in a secure position. The sealing faces 139 of the motor housing 103 and the countersealing faces 143 of the brush carrier plate 131 firmly engage one another. Furthermore, on the bottom 173 of the bearing seat 123 a spring 175 is provided by means of which the rotor shaft 113 is held without play.

In this manner, knocking noises during operation are securely avoided. The spring 175 engages the outer race of the ball bearing 125.

It will be understood that the above description of the present invention is susceptible to various modifications, changes and adaptations, and the same are intended to be comprehended within the meaning and range of equivalents of the appended claims.

What is claimed is:

1. An electric motor assembly, comprising
    (a) a motor housing including
        (1) a generally cylindrical housing shell having inner and outer cylindrical surfaces and opposite first and second ends;
        (2) an extension adjoining said second end; said extension having an inner conical sealing face; and
        (3) a base part closing said first end;
    (b) a rotor disposed in said motor housing and including
        (1) a rotor shaft; and
        (2) a commutator mounted on said rotor shaft and being situated adjacent said second end of said motor housing;
    (c) a first bearing mounted in said motor housing adjacent said first end and supporting said rotor shaft;
    (d) a second bearing affixed to said rotor shaft and being situated in said zone;
    (e) a brush assembly held in said motor housing in said zone; said brush assembly including
        (1) a brush carrier plate closing liquid-tight said second end of said motor housing; said brush carrier plate having a bearing seat for centering and supporting said second bearing; said brush carrier plate including a fitting part push-fitted into said cylindrical housing shell at said second end thereof; said brush carrier plate having
            (i) an outer cylindrical fitting face being in engagement with said inner surface of said cylindrical housing shell; and
            (ii) a terminal conical sealing face adjoining said outer cylindrical fitting face and being in a face-to-face sealing engagement with said inner conical sealing face of said extension of said motor housing; and
        (2) brushes supported in said brush carrier plate; said brushes being in contact with said commutator.

2. The electric motor assembly as defined in claim 1, wherein said extension includes an annular coupling flange forming part of said motor housing and adjoining said second end of said housing shell; said inner conical sealing face forming part of said annular coupling flange.

3. The electric motor assembly as defined in claim 2, wherein said brush carrier plate and said annular coupling flange each have outer surfaces oriented away from said motor housing and are coplanar with one another.

4. The electric motor assembly as defined in claim 3, further comprising a closed-circuit sealing lip formed on and projecting from said outer surface of said brush carrier plate.

5. The electric motor assembly as defined in claim 1, wherein said brush carrier plate has a circular periphery and has a bottom part; said brush carrier plate further having a collar formed on said bottom part of said brush carrier plate; said outer cylindrical fitting face being constituted by an outer face of said collar.

6. The electric motor assembly as defined in claim 5, further comprising circumferential sealing lips provided on said outer face of said collar and projecting therefrom.

7. The electric motor assembly as defined in claim 5, wherein said collar has a circumferential inner face widening in an axial direction toward a free end of said collar.

8. The electric motor assembly as defined in claim 5, wherein said collar has a circumferential inner face widening in an axial direction at an angle of 2° toward a free end of said collar.

9. The electric motor assembly as defined in claim 1, further comprising permanent magnets secured to said inner cylindrical surface of said housing shell; the assembly being formed of a first structural unit composed of said rotor, said first and second bearings carried on said rotor shaft and said brush carrier plate connected to said second bearing by means of said bearing seat, and a second structural unit composed of said housing shell and said permanent magnets.

10. The electric motor assembly as defined in claim 9, wherein said housing shell includes a deep-drawn bearing seat receiving said first bearing.

11. The electric motor assembly as defined in claim 10, wherein said first bearing has an outer race and said deep-drawn bearing seat has a base; further comprising a spring engaging said base and said outer race for urging said first bearing away from said base.

12. The electric motor assembly as defined in claim 1, further comprising permanent magnets carried on said cylindrical inner surface of said housing shell; said permanent magnets being arranged such as to hold the rotor in position by magnetic forces in said motor housing.

* * * * *